F. K. PLUMBLY.
DEVICE FOR SAFE TRANSPORTATION OF EGGS.
APPLICATION FILED MAY 20, 1913.
1,129,119.
Patented Feb. 23, 1915.
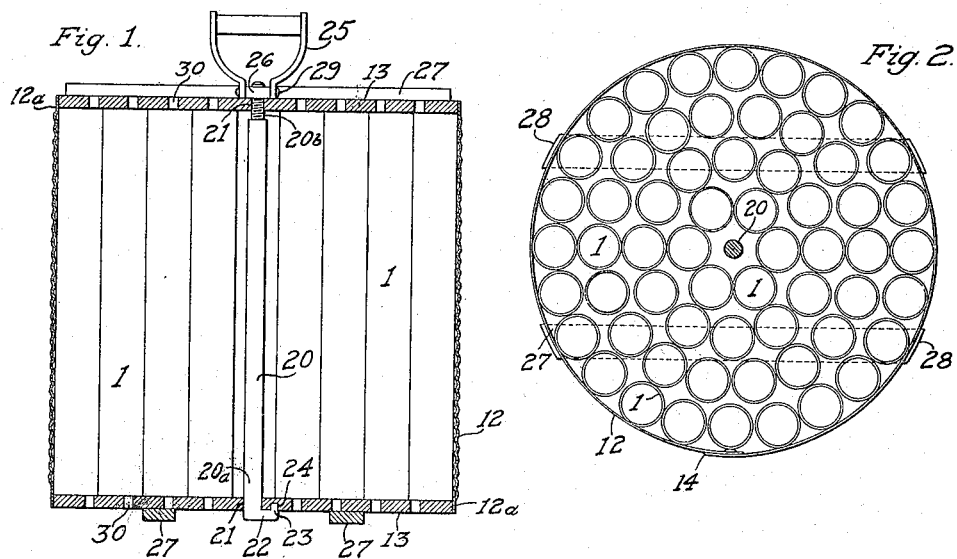
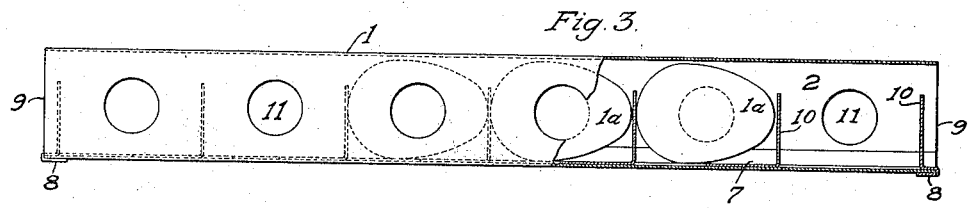
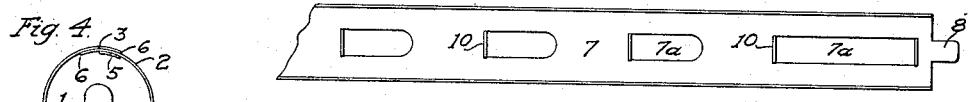
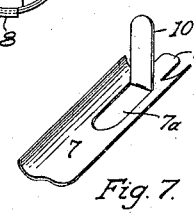
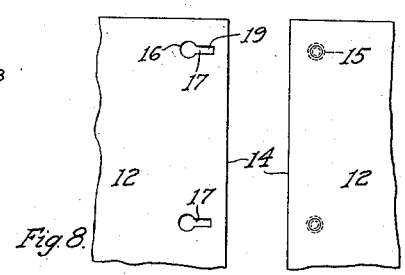
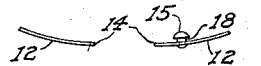
Witnesses.
Inventor
Frederick K. Plumbly
By
Benjamin Amas
Attorney

UNITED STATES PATENT OFFICE.

FREADERICK K. PLUMBLY, OF MOUNT IVY, NEW YORK, ASSIGNOR TO PLUMBLY STEEL EGG CASE COMPANY, OF NEW YORK, N. Y., A CORPORATION OF NEW YORK.

DEVICE FOR SAFE TRANSPORTATION OF EGGS.

1,129,119.　　　Specification of Letters Patent.　　Patented Feb. 23, 1915.

Application filed May 20, 1913. Serial No. 768,699.

*To all whom it may concern:*

Be it known that I, FREADERICK K. PLUMBLY, a citizen of the United States, and resident of Mount Ivy, in the county of Rockland and State of New York, have invented certain new and useful Improvements in Devices for Safe Transportation of Eggs, of which the following is a specification.

This invention relates to devices for transporting eggs safely, and its principal object is to provide simple, efficient, economic, and improved means for handling, transporting, and storing large quantities of eggs without breakage or other loss.

Other objects are to provide improved means for thorough ventilation of the eggs while in transit or storage whereby their deterioration is prevented, for conveniently handling the eggs, and for effectually sealing the devices containing the eggs to prevent unauthorized tampering with the contents.

Other object and advantages will hereinafter appear.

In the accompanying drawings,—Figure 1 is a sectional elevation of the egg transporting receptacle, taken on the longitudinal center line thereof, showing it loaded with egg fillers and ready for general handling and shipment. Fig. 2 is a plan view of Fig. 1, and shows the general arrangement of the tubular egg fillers, one of the heads being shown removed for clearer illustration. Fig. 3 is a general elevation, partly in full and partly sectional, of one of the tubular egg fillers. Fig. 4 is an end view of Fig. 3. Fig. 5 is a perspective view of the end of the egg filler, and shows the means of locking the edges of the filler-sheet thereat. Fig. 6 is a plan view, partly broken away, showing the metal strips and springs of the egg fillers. Fig. 7 is a perspective view of the end of the metal strip. Fig. 8 is a fragmentary view showing the edges of the sheet which holds the fillers, and the manner of locking and unlocking said edges. Fig. 9 is an end view of Fig. 8.

The filler tube 1 is made of an oblong sheet 2, of cardboard or other tough and pliant material suitable for this purpose, which is curved to the tubular cylindrical form shown. At each corner of one of the long sides of the sheet 2 is provided a slit 3, and a hole 4 is provided at each corner of the opposite side of the sheet, whereby when the sheet is curved into a tube the slitted portions 5 may be passed through the holes 4, as shown in Fig. 5, and the edges 6 of the sheet thereby locked together to maintain the tubular form.

Within the tube 1 is placed a sheet-metal strip 7, preferably of spring steel, which is of the same length as the tube and in cross-sectional shape follows its curvature, Figs. 4 and 7. Said strip is held against the inner side of the tube, and longitudinal and lateral displacement thereof prevented, by a projection or ear 8 thereon at each end being bent to lap around the edges 9 of the tube 1, as shown in Fig. 3. The strip 7 is stamped out at several places $7^a$ along the middle portion thereof, whereby a plurality of flat springs 10 are formed, which extend from the strip perpendicularly to the axis of the tube. The springs 10 are evenly spaced and distanced to permit eggs to be placed between them lengthwise in the direction of the axis of the tube, with some room for clearance and slight movement, the inner diameter of the tube being made slightly larger than the width of the eggs.

To place the eggs $1^a$ within the filler the strip 7 is first secured to the tube 1, the eggs inserted, and the tube then closed. Another way is to maintain the tube closed, place the eggs upon the strip 7, and then insert the strip through the open end of the tube therewithin and lap the ears 8 thereover. Openings 11 are provided at the opposite sides of the tube, which serve for admitting ample air within the fillers to permit ventilation while the eggs are in transit, said holes being also convenient for candling the eggs while held within the fillers and for other purposes. The filler is preferably proportioned to hold six eggs, as this number is usually found convenient for counting and general handling.

In order to ship the loaded egg fillers, a receptacle is provided therefor, Figs. 1 and 2, comprising a corrugated metal sheet 12 and circular wooden heads 13 therefor. Said sheet is rolled into curved or crescent form, and can be readily curled into circular form by its edges 14 being pulled toward each other and locked to constitute a shell, as shown in Fig. 2. The edges 14 are locked by means of buttons 15 riveted adjacent one edge being passed through the circular part 16 of openings 17 in the opposite edge, and the shanks 18 of the buttons being drawn against the extremity of the slotted portion 19 of said openings. To join the heads 13 to the sheet 12 they are placed within the ends 12ª of the sheet, or what is now the shell, and a rod 20 constituting a bolt is passed through openings 21 provided at the centers of said heads, and they are therewith bolted together. One end 20ª of said rod is flattened and bent at 22 and has a projecting lug 23 passing into a recess 24 of the head, which prevents the end of the rod passing therethrough and also holds it against rotation. The opposite ends 20ᵇ of the rod is threaded and passes through the opening 21 of the opposite head. A handle 25 having a tapped nut 26 threads over said tapped end 20ᵇ and being tightened secures both heads 13 forcibly to the sheet 12. Straps 27 are secured to the heads 13 and projecting beyond the shell 12 at 28 serve, among other objects, to limit the movement of the heads within the shell when said handle is thus tightened. The handle 25 is pivoted to the nut 26 at 29 whereby it normally lies flat, projecting no farther than said straps, and is therefore not in the way when the receptacles are loaded in freight or in storage.

When the loaded egg fillers are to be shipped they are placed within the receptacle as shown in Fig. 2, the fillers arranging themselves readily as indicated. The heads may then be bolted, making the filled receptacle at once ready for shipment or storage. The height of sheet 12 is proportioned to allow the heads 13 to snugly hold the extremities 9 of the fillers, and the width of the shell is preferably adapted to contain sixty fillers (30 doz. eggs), as this number of eggs is considered convenient for handling, with respect to weight, volume, and counting, when the receptacles are in shipment or storage.

As each egg rests upon a spring 10, any jar to which the receptacle and fillers may be subjected is taken up by said springs and fracture of the eggs thereby prevented. Also, due to the construction of this receptacle, and to the form of the fillers and their arrangement therein, general breakage thereof and of the eggs, which occurs with present day crating, is prevented.

It will be evident that the handle 25 offers a very convenient means for carrying the filled receptacles about and also conduces to careful placing of the receptacles when loading and unloading.

If desired, a suitable seal may be fixed partly upon the nut 26 of the handle and on a portion of the head 13 adjacent thereto, whereby unscrewing of the handle will be detected and unauthorized tampering with the contents of the receptacle prevented.

Besides reinforcing the heads 13 and limiting their movement into the shell, the straps 27 also serve to separate the receptacles when placed upon each other, whereby air can gain access therein through perforations 30 provided in said heads. It will be thus noted that when the eggs are loaded in transit and in storage they are thoroughly ventilated and ample air is admitted to each egg in the receptacle; the air passing readily around the spaces between the receptacles, due to their round form, and through the top, and enters the spaces between the round fillers and through the holes 11 to each egg.

After all the eggs have been taken out from the devices, upon arrival to their destination or removal from storage, all the parts comprising the receptacle, and the fillers, may be shipped back separately to be refilled with eggs and again transported, and the devices may be thus used over again any number of times. When shipping the parts back the edges 14 of sheet 12 are unlocked and the sheet spread out in crescent form, so that any number of these sheets belonging to various receptacles may be placed one adjacent the other to occupy comparatively small space. In the same manner all the heads 13, rods 20, and handles 25 belonging to various receptacles may be piled together. Said parts being entirely interchangeable any set thereof may be taken up to constitute a receptacle. The fillers may be shipped back by opening the tubes 1, spreading the sheets 2 thereof flat, and pressing the springs 10 back to lie flat upon each other. All the parts can be therefore shipped back in greatly reduced bulk at comparatively little expense.

It is found that loading eggs with this device requires less freight and storage space than present day crating, and is therefore less expensive. The reshipment and the repeated use of the devices likewise conduce to lowering the cost of handling eggs on a large scale.

Variations may be resorted to within the scope of the invention, and portions of the improvements may be used without others.

Having thus described my invention, I claim:—

1. The combination of an egg filler tube for holding eggs, a strip extending along the length of the tube and held to its inner side against displacement, and springs projecting from said strip and arranged to be disposed between the eggs.

2. The combination of an egg filler tube for holding eggs, a strip extending along the length of the tube and held to its inner side against displacement, said strip being curved in cross-section, and springs projecting from said strip and arranged to be disposed between the eggs.

3. The combination of an egg filler tube comprising an oblong sheet adaptable to be curved into tube form for holding eggs, means to lock the edges of said sheet for maintaining the sheet in tubular form, a strip extending along the length of the tube on its inner side, and springs projecting from said strip and arranged to be disposed between the eggs.

4. An egg filler tube comprising an oblong sheet adaptable to be curved into tube form for holding eggs, means to lock and unlock the edges of said sheet for maintaining the sheet in tubular form, and metallic springs fixed on said sheet adaptable to be extended transversely therefrom when in tubular form and disposed between the eggs.

5. An egg filler tube comprising a sheet adaptable to be curved into tube form for holding eggs, and metallic springs fixed on said sheet adaptable to be extended transversely therefrom when in tubular form and disposed between the eggs to protect the eggs against shocks imparted to said tube longitudinally.

Signed at the city of New York, in the county of New York, and State of New York, this 5th day of May, A. D. 1913.

FREADERICK K. PLUMBLY.

Witnesses:
CHAS. W. LA RUE,
B. ROMAN.

Copies of this patent may be obtained for five cents each, by addressing the "Commissioner of Patents, Washington, D. C."